United States Patent [19]

Dodson

[11] Patent Number: 4,641,778
[45] Date of Patent: Feb. 10, 1987

[54] ELECTRONIC WATER HEATER THERMOSTAT SYSTEM

[75] Inventor: David M. Dodson, Holland, Mich.

[73] Assignee: Robertshaw Controls Company, Richmond, Va.

[21] Appl. No.: 720,856

[22] Filed: Apr. 8, 1985

[51] Int. Cl.⁴ .................................................. G05D 15/00
[52] U.S. Cl. .................................. 236/20 R; 236/78 R
[58] Field of Search ............... 236/20 R, 78 R, 91 G; 323/366; 219/499, 497, 504, 505

[56] References Cited

U.S. PATENT DOCUMENTS

| | | | |
|---|---|---|---|
| 3,678,247 | 7/1972 | Sawa et al. | 219/499 X |
| 3,861,624 | 1/1975 | Lear | 236/91 G X |
| 4,024,725 | 5/1977 | Uchida et al. | 236/91 G X |
| 4,361,274 | 11/1982 | Raleigh et al. | 236/91 G X |
| 4,404,462 | 9/1983 | Murray | 219/497 |

Primary Examiner—Harry Tanner
Attorney, Agent, or Firm—Malcolm R. McKinnon

[57] ABSTRACT

An electronic water heater thermostat system for controlling the heating of water in residential and commercial water heaters, the system incorporating improved circuitry for controlling the water temperature set point and hysteresis and enabling the use of low cost, low tolerance potentiometers providing a precision voltage ratio for use in the system circuitry.

25 Claims, 15 Drawing Figures

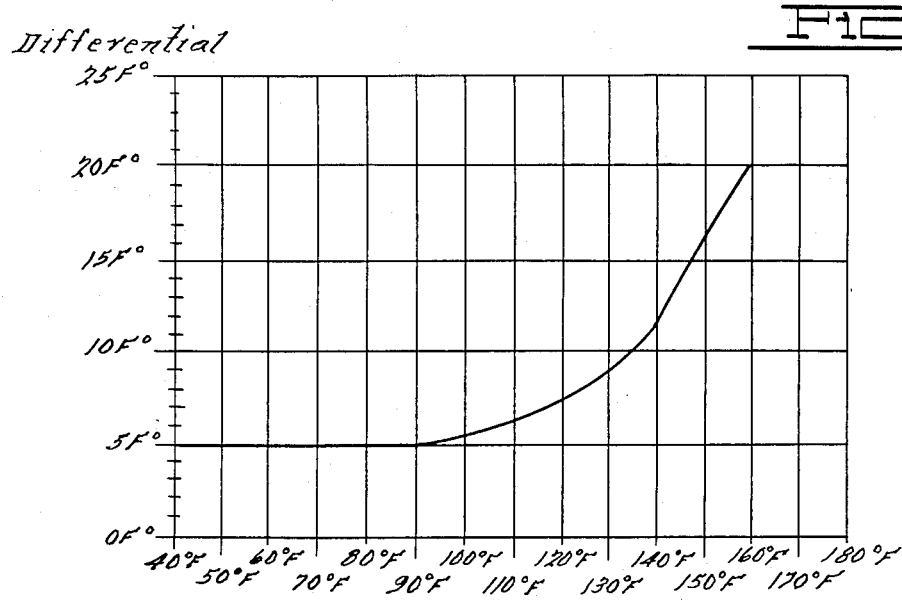
Fig. 3
Differential vs Setpoint-Variable Differential Waterheater Thermostat
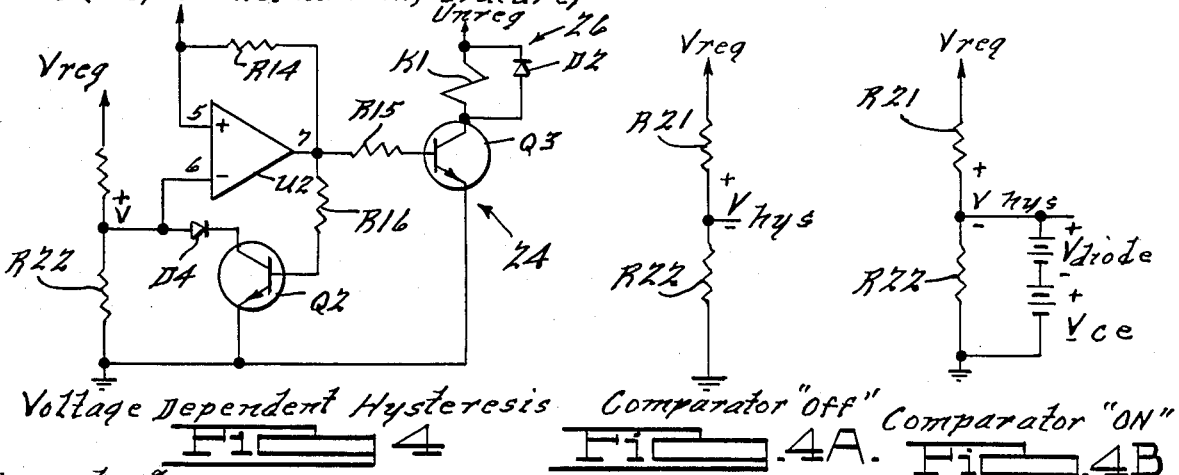
Fig. 4  Voltage Dependent Hysteresis
Fig. 4A  Comparator "OFF"
Fig. 4B  Comparator "ON"
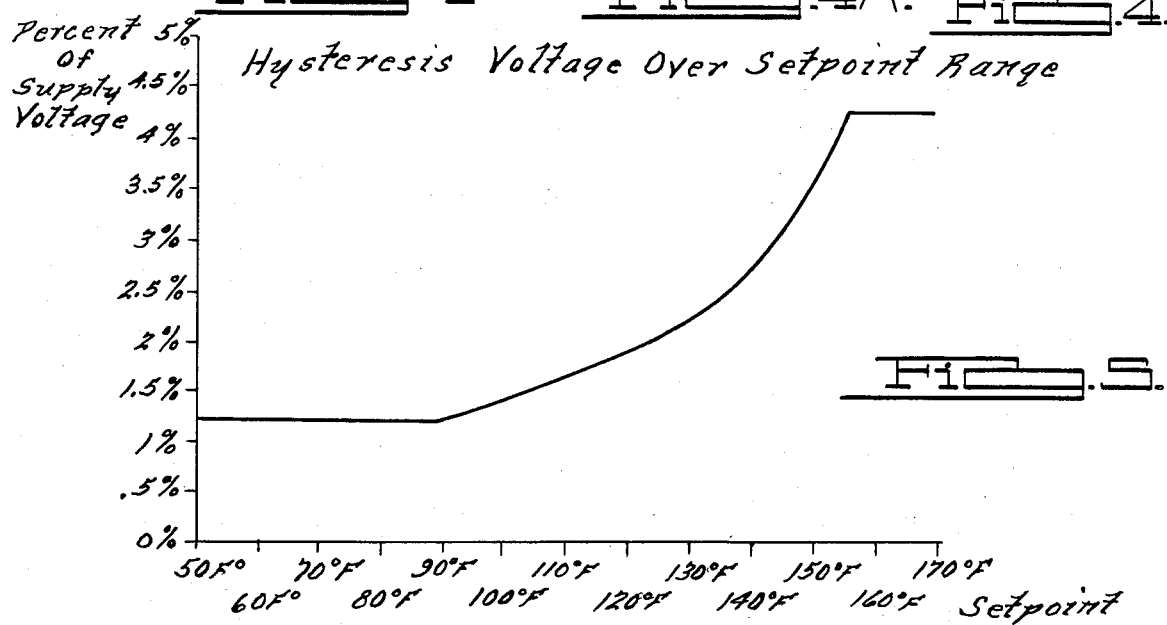
Fig. 5  Hysteresis Voltage Over Setpoint Range

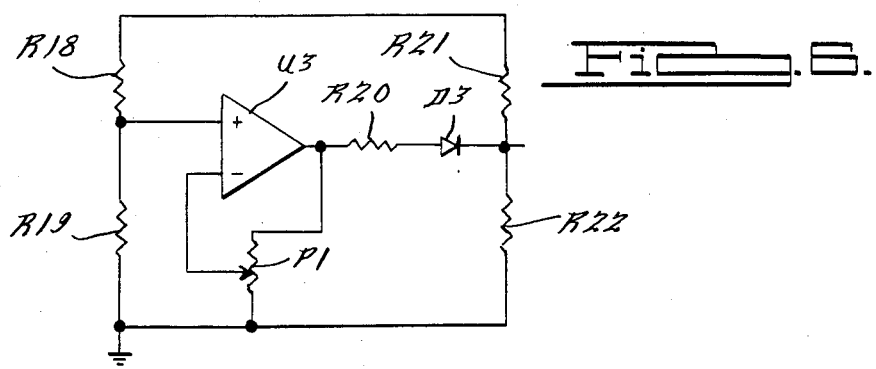
FIG. 6. Variable Differential Voltage Circuit
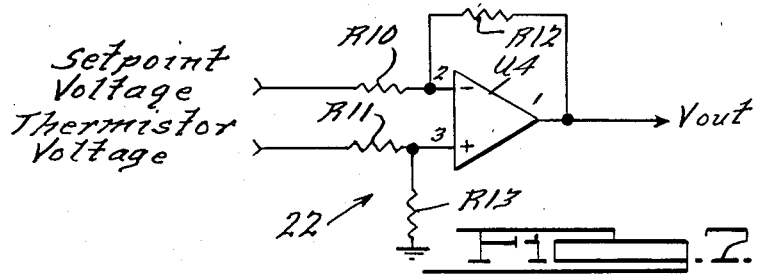
FIG. 7. Differential Amplifier Circuit
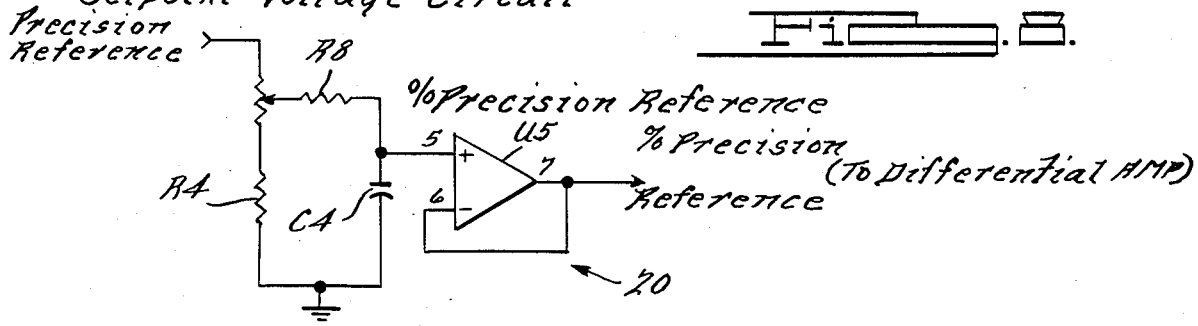
FIG. 8. Setpoint Voltage Circuit
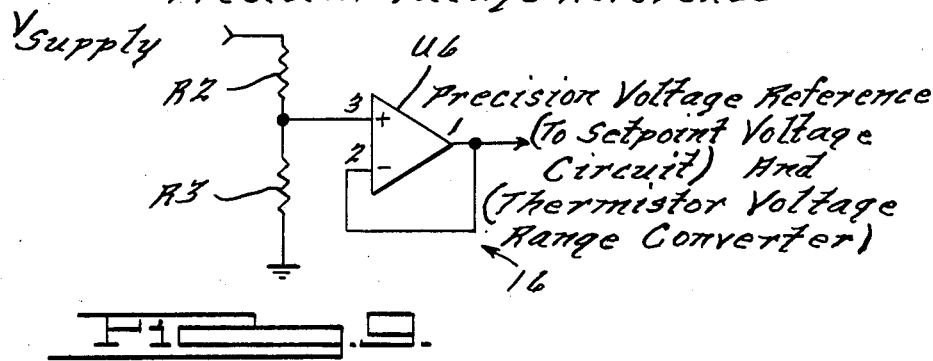
FIG. 9. Precision Voltage Reference

ELECTRONIC WATER HEATER THERMOSTAT SYSTEM

BRIEF SUMMARY OF THE INVENTION

This invention relates to temperature controls for water heaters and, more particularly, to an improved electronic water heater thermostat system particularly adapted for use in controlling the heating of water in residential and commercial water heaters conventionally utilized for the purpose of heating and storing water, such as in residential and commercial buildings. Systems embodying the present invention are particularly adapted for use with gas water heaters equipped with commercially available electronic intermittent pilot ignition controls well known to those skilled in the art, although it will be understood that the present invention is also applicable to other uses including uses in other fields.

Heretofore, temperature controls have been utilized for the purpose of controlling the heating of water in residential and commercial water heaters utilized for the purpose of heating and storing water in commercial and residential buildings. For example, for many years, electromechanical rod and tube systems, well known in the art, have been in use for controlling the heating of water in water heaters. However, such electromechanical rod and tube systems are subject to numerous disadvantages attributable to the electromechanical nature of the devices and may require repair or replacement due to electromechanical failures and other factors. In addition, prior temperature controls for water heaters are not readily adaptable to meet the requirements of electronic intermittent pilot ignition control systems which are now commercially available and which intermittent pilot ignition control systems provide significant savings in fuel costs.

An object of the present invention is to overcome disadvantages in prior water heater controls and to provide an improved electronic water heater thermostat system which is particularly adapted for use with gas water heaters equipped with commercially available electronic intermittent pilot ignition controls.

Another object of the present invention is to provide an improved electronic water heater thermostat system which may be easily operated by the users thereof and which enables precise repeatable control of the temperatures in a water heater.

Another object of the present invention is to provide an improved electronic water heater thermostat system incorporating improved means for controlling hysteresis by a single voltage referenced to ground.

Another object of the present invention is to provide an improved electronic water heater thermostat system incorporating improved means for controlling a temperature set point through the use of low cost, low tolerance potentiometers.

Another object of the present invention is to provide an improved electronic water heater thermostat system which may be readily adapted to provide a single sensor constant water temperature differential, a single sensor variable water temperature differential, or a dual sensor constant water temperature differential.

Another object of the present invention is to provide an improved electronic water heater thermostat system incorporating improved means for shutting down the system in the event of the electrical shortage or disconnection of a system module.

Still another object of the present invention is to provide an improved electronic water heater thermostat system that is economical to manufacture, durable, efficient and reliable in operation.

The above as well as other objects and advantages of the present invention will become apparent from the following description, the appended claims and the accompanying drawings.

BRIEF DESCRIPTION OF THE DRAWINGS

FIG. 3 is a graph illustrating the differential versus set point in the variable differential water heater thermostat system embodying the present invention;

FIG. 4 is a schematic circuit diagram of the voltage dependent hysteresis circuit incorporated in the system embodying the present invention;

FIG. 4A illustrates the condition of the voltage dependent hysteresis circuit illustrated in FIG. 4 when the comparator is "off";

FIG. 4B illustrates the condition of the voltage dependent hysteresis circuit illustrated in FIG. 4 when the comparator is "on";

FIG. 5 is a graph illustrating the hysteresis voltage over the set point range;

FIG. 6 is a schematic circuit diagram of the variable differential voltage circuit incorporated in the system embodying the present invention;

FIG. 7 is a schematic circuit diagram of the differential amplifier circuit incorporated in the system embodying the present invention;

FIG. 8 is a schematic circuit diagram of the set point voltage circuit incorporated in the system embodying the present invention;

FIG. 9 is a schematic circuit diagram of the precision voltage ratio circuit incorporated in the system embodying the present invention;

DETAILED DESCRIPTION

Figure 1:
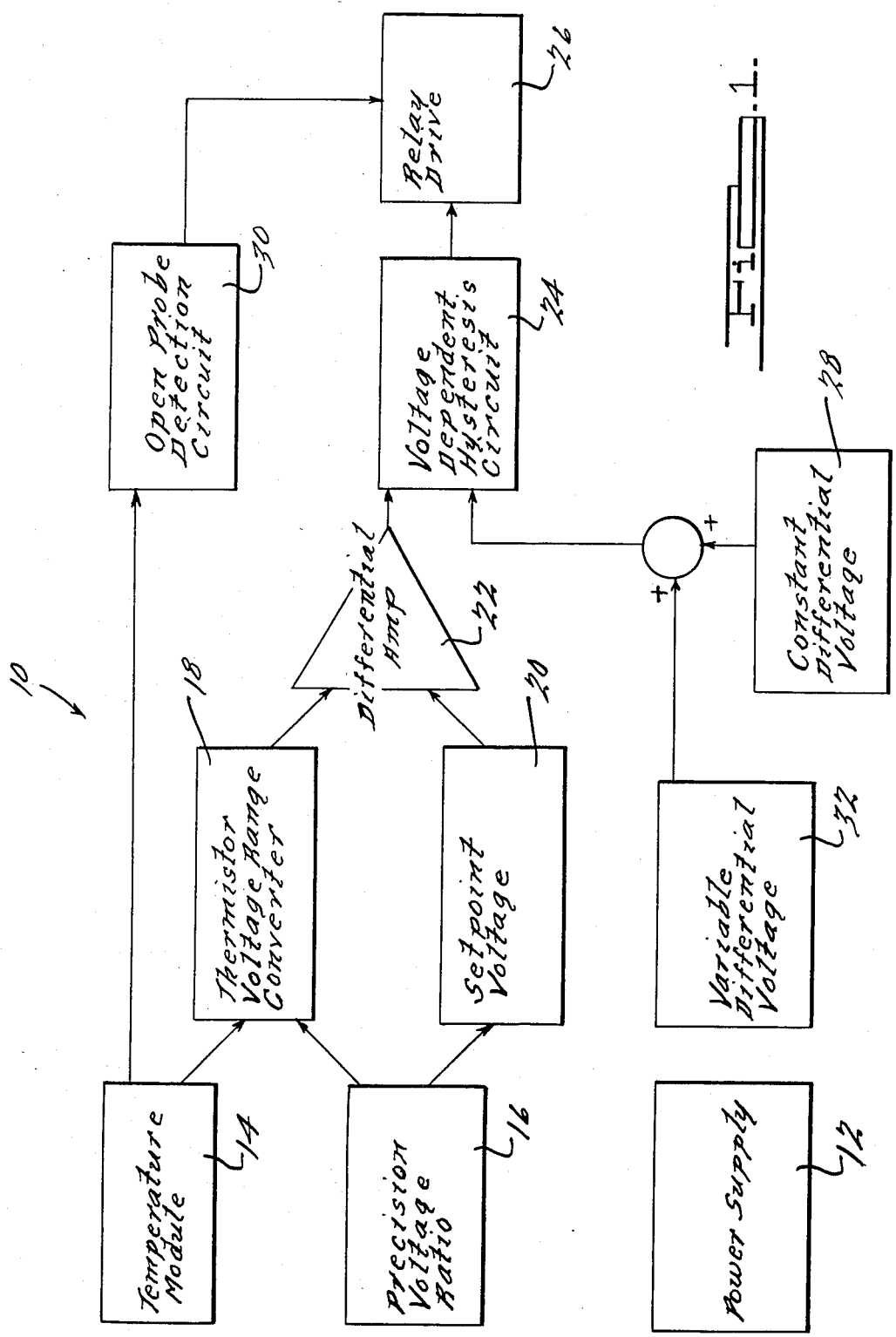
FIG. 1 is a schematic block diagram of an electronic water heater thermostat system embodying the present invention.

Referring to the drawings, an electronic water heater thermostat system, generally designated 10, embodying the present invention is illustrated therein, the system 10 being adapted to control, through relay contacts K1, any of a wide variety of commercially available electronic intermittent pilot ignition controls 11 or other commercially available, electrically operable pilot, ignition or fuel valve controls. It will be understood that the present invention is also applicable to other uses including uses in other fields. As shown in FIG. 1, the system 10 includes a power supply circuit 12, a temperature module circuit 14, a precision voltage ratio circuit 16, a thermistor voltage range converter circuit 18, a set point voltage circuit 20, a differential amplifier circuit 22, a voltage dependent hysteresis circuit 24 and a relay drive circuit 26. The system 10 also includes a constant differential voltage circuit 28, and an open probe detection circuit 30. In addition, if desired, the system 10 may also include a variable differential voltage circuit 32 as will be described hereinafter in greater detail.

In general, the system 10, in the single sensor constant differential mode, utilizes a thermistor to sense the temperature of the water in the water heater, and the desired temperature set point is selected by adjusting a potentiometer. If desired, two set point ranges may be readily made available, as for example, 48° F. to 172° F. and 48° F. to 152° F. The set point range is set by a mechanical limit on the potentiometer, and the differential remains the same throughout the range and is therefore known as "constant differential". It will be understood that the "set point" is the desired maximum temperature as selected by the potentiometer, and the "differential" is the amount of temperature swing below the set point temperature. As is well known in the art, systems intended to control water heater temperature should have a certain amount of differential swing as otherwise a very rapid on/off cycle will occur. In the system 10, the set point temperature is compared to the thermistor temperature, and the relay K is energized if the system 10 is calling for heat so as to effect operation of the water heater pilot, ignition or fuel valve controls. When the set point temperature is reached, the relay K is deenergized to shut off the water heater fuel, and the temperature of the water in the water heater tank must then cool to the differential point before the relay K is energized again. The relay contacts K1 supply 24 volt alternating current to the electronic intermittent pilot ignition control 11, which may be any of a wide variety of commercially available electronic intermittent pilot ignition controls or which may be any other fuel control capable of being operated through the agency of the relay contacts K1. The intermittent pilot ignition control 11 functions to ignite and monitor the flame utilized to heat the water in the tank. A heat sensitive fuse ECO is provided in series with the 24 volt alternating current supplied to the water heater thermostat system to provide a measure of safety if the thermostat fails. The single sensor variable differential control is identical to the constant differential control except that the differential varies depending on the set point when the variable differential voltage circuit 32 is incorporated in the system 10. At the lower temperature settings, a tight differential is desired to prevent the water from freezing. At normal temperature settings a somewhat wider differential is needed to prevent layering conditions in the water tank but still provide comfortable water temperature. At the hotter temperature settings, a wide differential is required to prevent layering conditions in the water tank. FIG. 3 is a graph illustrating the differential versus the set point when the system incorporates the variable differential circuit 32 which will be described hereinafter in greater detail.

It should also be understood that hysteresis, as it applies to the voltage circuitry embodied in the system 10, is the difference between the "on" voltage and the "off" voltage. In other words, the hysteresis is the voltage difference between the change of states in the system 10. In the system 10, the "on" state is when the relay K is energized and the "off" state is when the relay K is deenergized. A driver transistor is utilized to drive the relay coil, and the driver transistor in the system 10 is driven by a comparator, the comparator providing the hysteresis necessary for the differential swings in the system 10.

Figure 2:
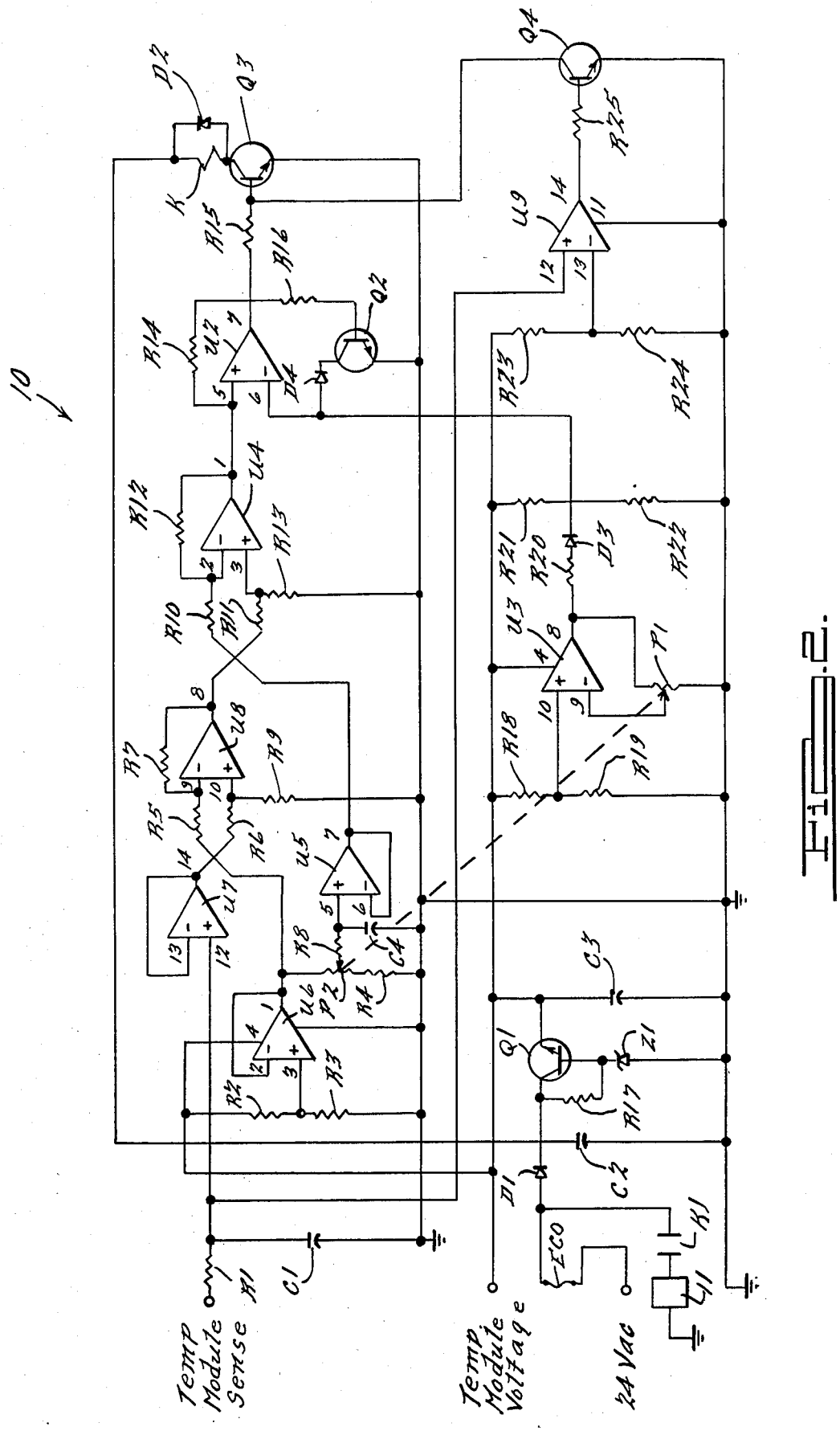
FIG. 2 is a schematic circuit diagram of the electronic water heater thermostat system embodying the present invention.
Figure 10:
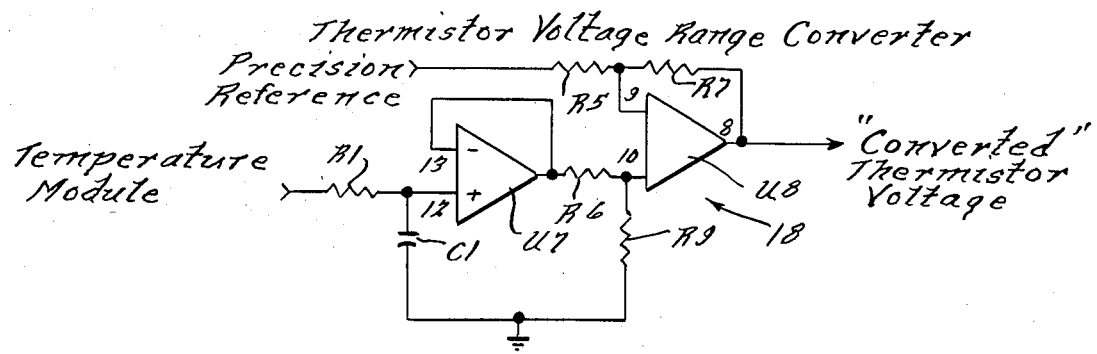
FIG. 10 is a schematic circuit diagram of the thermistor voltage range converter circuit incorporated in the system embodying the present invention.

As shown in FIGS. 1, 2 and 4, the system 10 includes the voltage dependent hysteresis circuit 24 which is comprised of the resistors R14, R15, R16, R21 and R22, the quad operational amplifier U2, the transistors Q2 and Q3, the diodes D2 and D4 and the relay coil K. The quad operational amplifier U2 is a section of an LM 2901 quad operational amplifier and positive feedback is used to configure the operational amplifier to a comparator. If a large voltage is present at the pin 6, the circuit will have a large amount of hysteresis. When a small voltage is present at the pin 6, the circuit will have a small amount of hysteresis. The voltage into the pin 5 represents the difference between the set point temperature and the thermistor temperature. If the set point and thermistor temperatures are equal, in the system 10 the voltage into the pin 5 will be 0.7 volts. If the thermistor temperature is colder than the set point temperature, in the system 10 the voltage will be greater than 0.7 volts. If the thermistor temperature is hotter than the set point, the voltage in the system 10 will be less than 0.7 volts. For example, if the thermistor is at 120° F. and the set point is set to 130° F., in the system 10 approximately 3.059 volts will be present at the pin 5. If the thermistor and set point temperatures are both at 130° F. then 0.7 volts will be present at the pin 5 in the system 10. If the thermistor temperature is 140° F. and the set point is set at 130° F., zero volts will be present on the pin 5.

For the constant differential circuitry the hysteresis voltage into the pin 6 is the simple voltage divider consisting of the resistor R21 and the resistor R22. If the voltage on the pin 6 is greater than the voltage on the pin 5, the comparator will be switched "on" (the system is calling for heat), the transistor Q3 will be driven, and the relay coil K will be energized. The output of the comparator U2 will also drive the feedback transistor Q2, thereby clamping the voltage on the pin 6 to approximately 0.7 volts which is the series voltage drop across the diode D4 and the transistor Q2's collector-emitter junction. The voltage at the pin 5 must now drop below 0.7 volts before the comparator U2 can switch off and deenergize the relay K. It should be understood that before the voltage at the pin 5 can be 0.7 volts, in the system 10 the set point and thermistor temperatures must be equal. The comparator U2 will not switch off until the thermistor temperature equals the set point temperature. Consequently, the relay K will be deenergized when the thermistor and set point temperatures are equal.

The voltage dependent hysteresis circuit 24 will keep the relay K energized until the water tank temperature has reached the set point temperature. The relay K must then be kept deenergized until the tank temperature cools to the desired differential point. When the comparator U2 switched off, the relay drive transistor Q3 was turned off as well as the feedback transistor Q2. Because the transistor Q2 is off, the hysteresis voltage set up by the resistors R21 and R22 is present at the pin 6 of the comparator U2. Before the comparator U2 can switch on again, the voltage at the pin 5 must exceed the voltage at the pin 6. This can only happen if the thermistor temperature cools to some point below the set point temperature. For a tight differential, the voltage at the pin 6 can be small. If a wide differential is desired, voltage can be made large. This hysteresis voltage controls the point where the comparator U2 will switch on again. Thus there is voltage dependent hysteresis. The resistor R14 provides some positive feedback necesary for smooth, oscillation-free switching of the operational amplifier U2. The diode D2 clamps the reverse transients from the relay coil K so as not to damage the transistor Q3.

If desired, the system 10 may be provided with the variable differential voltage circuit 32 whereby the system 10 has a differential dependent on the set point as shown in the graph of FIG. 3. In order to accomplish a variable differential throughout the set point range, the variable differential voltage circuit 32 produces a voltage dependent on the set point temperature. The voltage out of this circuit is not a simple linear voltage but is constant at the lower set point, increases linearly at approximately 110° F. and finally becomes constant again at the upper temperature set point. A graph of this variable differential voltage is shown in FIG. 5. As is well known in the art, referencing the end points of a potentiometer to the supply voltage can only produce a linear voltage, whereas a nonlinear voltage is utilized in the system 10. Since a potentiometer is essentially two variable resistors separated by the wiper arm, as the potentiometer shaft is rotated, one resistor increases as the other decreases. This relationship of the two resistors is used to set the gain in the operational amplifier U3. The variable differential voltage circuit is illustrated in FIG. 6 and is comprised of the resistors R18, R19, R20, R21 and R22, the diode D3, the operational amplifier U3 and the potentiometer P1 of a gang potentiometer P. The gain of an operational amplifier in this configuration is 1 plus R1/R2 where R1 is the "top" resistor and R2 is the "bottom" resistor of the potentiometer P1. When the potentiometer P1 of the gang potentiometer P is set to the coldest temperature, R1 is zero, R2 is 10E3, and the gain is one. When the potentiometer P1 is set to the hottest temperature, R1 is 10E3, R2 is zero and the gain is infinite. The graph illustrated in FIG. 5 shows the voltage out of the operational amplifier U3 versus the set point temperature. Under actual operating conditions, an operational amplifier will saturate as shown by the voltage curve. This saturation voltage is used for the constant differential portion of the curve at the hotter set points as illustrated in FIG. 5. The constant differential at the coldest set points is accomplished by the divider network comprised of the resistor R21, the resistor R22, and the diode D3. The resistor R21 and the resistor R22 set up the constant voltage at the lower set points. At the lower set points, the diode D3 isolates the constant voltage of the divider network from the output of the operational amplifier U3. As the set point is increased, the output from the operational amplifier U3 increases and the diode D3 begins to conduct adding to the divider network voltage. The final output voltage of the circuitry is shown in FIG. 5.

The resistors R18 and R19 set the voltage going into the variable gain amplifier U3. The conduction point of the diode D3 is controlled by adjusting the resistors R18 and R19. Graphically, the resistors R18 and R19 move the sloping portion of the curve left and right. The resistor R20 in series with the operational amplifier U3 output controls the saturation voltage seen at the voltage dependent hysteresis circuit. Graphically, the resistor R20 moves the curve past the diode conduction point up and down.

It will be understood that if it is desired to have the system 10 provide a constant differential as distinguished from a variable differential, the resistors R18, R29, R20, R21 and R22; the operational amplifier U3; the variable resistance P1 of the gang potentiometer; and the diode D3 are simply not included in the system 10.

The system 10 also includes the differential amplifier circuit 22. The differential amplifer circuit 22 outputs a voltage that represents the difference between the set point temperature and the thermistor temperature. The differential amplifier circuit illustrated in FIGS. 2 and 7 is comprised of the resistors R10, R11, R12 and R13 and the differential amplifier U4. The differential amplifier circuit 22 output voltage is input into the voltage dependent hysteresis circuit 24. As previously explained, this analog voltage tells the hysteresis circuit 24 where the thermistor temperature and set point temperature are in relation to one another. There are two inputs into the differential amplifier circuit 22. The set point input represents the set point temperature and the thermistor input the actual tank temperature. The set point voltage is actually a percentage of a reference voltage. When the set point potentiometer P is set to the coldest temperature, one hundred percent of this reference voltage is input into the differential amplifier U3. When the potentiometer P1 is set to the hottest position, approximately 2.5 percent of the reference voltage is input into the circuit. The thermistor voltage is similar to the set point voltage. When the thermistor temperature and set point temperatures are equal, the voltages into the differential amplifier U4 are approximately equal. The voltages are stated to be approximately equal because in the system 10 the thermistor temperature has been offset somewhat to produce 0.7 volts out of the differential amplifier when the thermistor temperature equals the set point temperature. The differential amplifier circuit 22 measures the difference between the thermistor and set point voltages, amplifies this differential voltage, and outputs it into the voltage dependent hysteresis circuit 24. Assuming that the resistors R12 and R13 are equal and the resistors R10 and R11 are equal, the gain of the measured differential is R12/R10 or R13/R11. With a supply voltage of 16 volts, a difference of 1° F. between the thermistor temperature and the set point temperature will produce approximately 1.0 volts at the pin 1 of U4. A temperature difference of 10° F. will produce 3.73 volts at the pin 1 of U4 in the system 10. The formula for any temperature difference is (303.66 mV/temperature difference) plus 0.7 volts. This equation is the only equation in the circuit that contains an absolute voltage (0.7 volts) instead of a ratiometric voltage. If the supply voltage is not 16 volts the 303.66 mV will change ratiometrically with respect to the rest of the circuit.

The set point voltage circuit 20 produces a voltage proportional to the desired set point temperature. When the potentiometer P2 is set to its full counterclockwise rotation, the wiper arm gives 100 percent of the reference voltage. When the potentiometer P2 is set to its full clockwise rotation, the wiper arm is at the junction of the full resistance of the potentiometer and the resistor R4. The resistor R4 prevents the wiper arm of the potentiometer P2 from going all the way to ground and consequently the voltage never reaches zero volts. This is to compensate for the operational amplifier offset voltage from the thermistor voltage circuit. When the potentiometer P2 is set to 172° F., 2.5 percent of the reference voltage is seen at the wiper arm. When the potentiometer is set to 48° F., 100 percent of the reference voltage is seen at the wiper arm. The set point voltage circuit 20 is comprised of the set point potentiometer P2, the resistors R4 and R8, the capacitor C4 and the operational amplifier U5. By using the potentiometer P2 as a ratiometric voltage divider, all tolerances of the potentiometer are eliminated. For example, a 10K potentiometer set at 50 percent of its rotation will produce 50 percent of the applied voltage. A 50K potentiometer set at 50 percent of its rotation will also produce 50 percent of the applied voltage. The compensation resistor R4 influences this divider network very little. Thus potentiometer tolerances are virtually eliminated in the system 10. As is well known in the art, the tightest tolerance available in a commercially available carbon potentiometer is approximately 10 percent at the least. Carbon potentiometers have poor temperature coefficients and also tend to drift in extended high ambient temperatures. These characteristics are also eliminated with the set point voltage circuit 20 which is a ratiometric circuit, the set point being a percentage ratio of a precision voltage reference resulting in an extremely accurate circuit. The set point voltage is as accurate as the precision resistors used for the reference voltage and, as is well known in the art, precision resistors are much cheaper as compared to precision potentiometer. The resistor R8 and the capacitor C4 filter any noise and transients that might be picked up by the potentiometer P2. The operational amplifier U5 is set to unity gain and provides a low impedance source to the differential amplifier U4. If the unity gain buffer was not used, the source impedance of the potentiometer P2 would add to one of the gain resistors (R10) and cause a shift in the gain of the differential amplifier.

The precision voltage ratio circuit 16 is used for the set point voltage as well as the thermistor voltage. This reference voltage is the dominant factor in the accuracy of the control. The precision voltage reference is not precision in the sense of an absolute voltage but rather a precision voltage ratio. The precision voltage ratio circuit is comprised of the resistors R2 and R3 and the unity gain operational amplifier U6. The resistors R2 and R3 set up a ratio of the supply voltage. This ratiometric concept functions in a manner similar to the set point voltage circuit in that the voltage out of the precision voltage ratio circuit 16 is completely independent of supply voltage variations. The voltage out of the junction of the resistor R2 and the resistor R3 will always be the same ratio. This ratiometric voltage is buffered by the unity gain operational amplifier U6 to provide a very low source impedance precision voltage.

The thermistor voltage range converter circuit 18 is comprised of the resistors R1, R5, R6, R7 and R9, the capacitor C1 and the differential amplifiers U7 and U8. In the system 10, the thermistor voltage from the temperature module ranges from approximately 1.82 percent of the supply voltage at 48° F. to approximately 1.54 percent at 172° F. If the supply voltage is 16 volts, the voltage from the temperature module is 2.918 volts at 48° F. and 2.465 volts at 172° F. in the system 10. This voltage range has to be compared with the set point voltage. In the system 10, the set point voltage ranges from 2.446 volts at 48° F. to essentially zero volts at 172° F. The voltage range converter circuit 18 converts the 2.918 to 2.465 volt range to 2.449 volts at 48° F. to essentially zero volts at 172° F. The expression "essentially zero volts" is utilized because in actuality the offset voltages from the operational amplifiers are present instead of zero volts. As previously mentioned, the voltage at 48° F. is 2.449 volts out of the thermistor range converter versus 2.446 volts from the set point voltage circuit. This small difference in voltage produces the 0.7 volts needed to switch the hysteresis circuit 24 when the thermistor temperature and set point temperatures are equal. If these voltages were equal at 48° F., the relay K would deenergize at a temperature colder than 48° F.

The thermistor voltage is filtered by the combination of the resistor R1 and the capacitor C1. The filtered voltage is isolated from the differential amplifier by a unity gain buffer. As with the differential amplifier circuit, a low source impedance circuit is essential for a stable gain. The other input to the differential amplifier is the precision voltage reference. The differential amplifier amplifies the difference between the thermistor voltage and the precision reference. If the thermistor voltage and the precision reference voltage are equal, essentially zero volts is produced at the output of the circuit. Zero volts equals 172° F. If the thermistor voltage is representing 48° F., the difference between the thermistor voltage and the precision reference, multiplied by the gain of the differential amplifier produces 2.449 volts (for a 16 volt supply). The circuit has thus converted the range of the thermistor voltages to 2.449 volts at 48° F. to essentially zero volts at 172° F.

Figure 11:
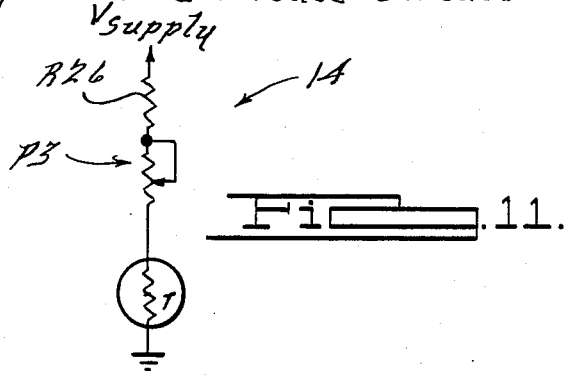
FIG. 11 is a schematic circuit diagram of the temperature module circuit incorporated in the system embodying the present invention.

The system 10 also incorporates the temperature module circuit 14 illustrated in FIG. 11. The temperature module circuit 14 provides a voltage output proportional to the temperature of the thermistor T. The temperature module circuit 14 illustrated in FIG. 14 includes the remotely mounted thermistor T, the resistor R26 and the trim potentiometer P3. This portion of the control is preferably mounted on a separate board known to those skilled in the art as a "daughter board", that plugs into the main control, the "mother board". This mother/daughter board arrangement allows complete interchangeability between controls and temperatures modules, so that any temperature module will function with any control and any control will function with any temperature module.

Figure 12:
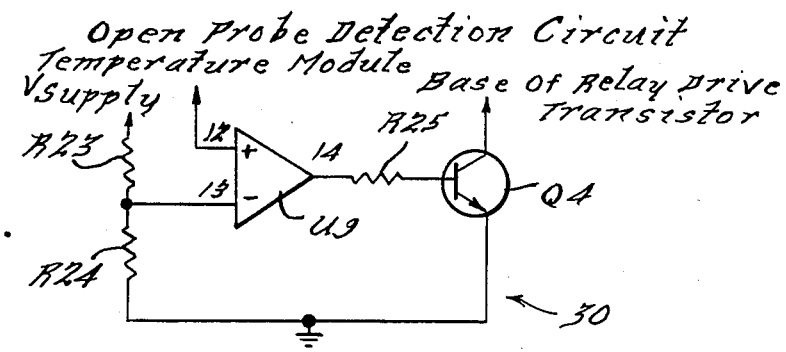
FIG. 12 is a schematic circuit diagram of the open probe detection circuit incorporated in the system embodying the present invention.

The open probe detection circuit 30 is illustrated in FIG. 12 and is comprised of the resistors R23, R24 and R25, and the comparator U9. The voltage from the temperature module has a negative slope. As temperature increases the voltage output from the module decreases. If the thermistor were to short, the control would see what appears to be a very high temperature and the relay K would deenergize thereby shutting off heat to the water tank. If the thermistor opened or the temperature module was disconnected, the control would see a very low temperature. The control will keep the relay K energized until the set point temperature is reached but without any means of sensing the temperature the relay K would stay on until the fuse ECO blows or a conventional pressure valve releases. To avoid any unnecessary damage, the open probe detection circuit 30 shuts down the system 10 if a shorted or disconnected module is detected. A reference voltage representing an invalid system temperature (minus 203° F.) is compared to the temperature module voltage. This reference voltage is produced by the resistors R23 and R24. If the temperature module is disconnected or the thermistor is open the voltage into the pin 12 will be higher than the reference voltage and the comparator U9 will turn on. In the "on" state of this operational amplifier, the transistor Q4 will be driven which removes power from the relay drive transistor Q3. Under normal operating conditions, the transistor Q4 is in the open collector state and does not affect the relay circuitry.

Figure 13:
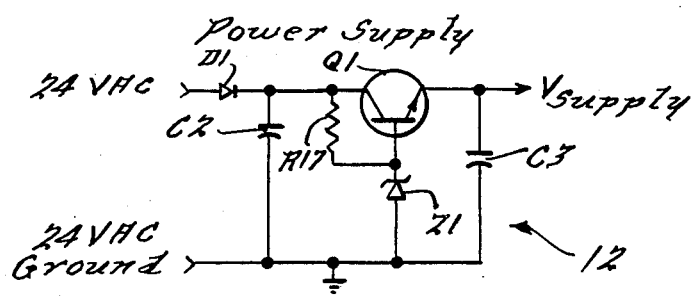
FIG. 13 is a schematic circuit diagram of the power supply circuit incorporated in the system embodying the present invention.

The power supply circuit 12 illustrated in FIG. 13 is a common unregulated and regulated DC supply. The power supply circuit 12 is comprised of the resistor R17, the diode D1, the zener diode Z1, the capacitors C2 and C3, and the transistor Q1. The capacitor C2 is charged up through the diode D1 to provide the unregulated voltage for the relay coil and the regulator circuit. The regulator uses the zener diode Z1 for a reference and the transistor Q1 to drop the required voltage.

An identification of and/or typical values for the components of the system 10, which are described hereinabove, are as follows:

| | | |
|---|---|---|
| R1 | Resistor | 22K ohms |
| R2 | Resistor | 90.9K ohms |
| R3 | Resistor | 16.4K ohms |
| R4 | Resistor | 220 ohms |
| R5 | Resistor | 30.1K ohms |
| R6 | Resistor | 30.1K ohms |
| R7 | Resistor | 158K ohms |
| R8 | Resistor | 22K ohms |
| R9 | Resistor | 158K ohms |
| R10 | Resistor | 49.9K ohms |
| R11 | Resistor | 49.9K ohms |
| R12 | Resistor | 763K ohms |
| R13 | Resistor | 768K ohms |
| R14 | Resistor | 10 M ohms |
| R15 | Resistor | 12K ohms |
| R16 | Resistor | 22K ohms |
| R17 | Resistor | 4.7K ohms |
| R18 | Resistor | 75K ohms |
| R19 | Resistor | 12K ohms |
| R20 | Resistor | 5.6K ohms |
| R21 | Resistor | 22K ohms |
| R22 | Resistor | 3.9K ohms |
| R23 | Resistor | 22K ohms |
| R24 | Resistor | 22K ohms |
| R25 | Resistor | 47K ohms |
| R26 | Resistor | 43K ohms |
| D1 | Diode | 1N 4004 |
| D2 | Diode | 1N 4004 |
| D3 | Diode | 1N 4004 |
| Q1 | Transistor | MPS-W-01A |
| Q2 | Transistor | 2N2222A |
| Q3 | Transistor | 2N2222A |
| Q4 | Transistor | 2N2222A |
| Z1 | Zener Diode | 1N 5246 |
| C1 | Capacitor | .047 mfd. 50 V |
| C2 | Capacitor | 150 mfd. 50 V |
| C3 | Capacitor | .047 mfd. 50 V |
| U2 | Operational Amplifier | LM2901 |
| U3 | Operational Amplifier | LM2901 |
| U4 | Operational Amplifier | LM2901 |
| U5 | Operational Amplifier | LM2901 |
| U6 | Operational Amplifier | LM2901 |
| U7 | Operational Amplifier | LM2901 |
| U8 | Operational Amplifier | LM2901 |
| U9 | Operational Amplifier | LM2901 |
| ECO | Heat Sensitive Fuse | |
| T | Thermistor | |
| P | Gang Potentiometer | |

It will understood, however, that these values and descriptions may be varied depending upon the particular application of the principles of the present invention.

In the operation of the system 10, the desired "off" temperature is set by the potentiometer P. This set point voltage is fed into the differential amplifier U4. The temperature module circuit 14 produces a voltage proportional to the temperature of the thermistor T. The voltage range from the temperature module circuit 14 is converted to match the set point voltage range by the voltage range converter circuit 18. This converted thermistor voltage is then input into the differential amplifier circuit 22. The differential amplifier circuit 22 produces a voltage proportional to the difference between the thermistor temperature and the set point temperature. This difference voltage is compared to a reference voltage in the voltage dependent hysteresis circuit 24. When the voltage into the voltage dependent hysteresis circuit 24 is approximately 0.7 volts, the circuit deenergizes the relay K. The difference voltage increases as the temperatures drift apart. When the voltage reaches the hysteresis voltage the comparator U2 reenergizes the relay K. The hysteresis voltage is constant throughout the set point range for the constant differential control. The hysteresis voltage varies with the set point when the variable differential voltage circuit 32 is incorporated in the system 10. The open probe detection circuit 30 shuts the system down if an open thermistor T or disconnected voltage temperature module circuit is detected.

While preferred embodiments of the invention have been illustrated and described, it will be understood that various changes and modifications may be made without departing from the spirit of the invention. For example, if desired, dual systems 10 may be utilized to work in tandem to control the heating cycle of a hot water heater with one system 10 controlling the lower level tank temperature in a water tank to a desired set point while the upper level tank temperature is controlled to the set point temperature of the lower tank level plus, for example, 10° F. By way of illustration, if the set point is set at 120° F., the lower tank temperature will never exceed 120° F. while the upper tank temperature will never exceed 130° F., the upper and lower tank temperatures being "offset" by 10° F. for the purpose of controlling layering conditions in large commercial water tanks. The differential may be easily set up on a priority basis with the first sensor (upper or lower) to reach its limit determining the differential. For example, if the lower tank sensor reaches its set point limit first, the dual system may be set up so that the lower tank temperature must cool to the lower system's differential point before another heating cycle can begin. If the upper tank sensor reaches the set point temperature plus 10° F. limit first, the upper tank temperature must cool to the upper system's differential point before another cycle period. Thus the upper and lower system's differentials may be made completely independent of one another, and if both upper and lower limits are reached in the same heating cycle, the dual systems may be set up so that both the upper and lower differential points must be reached before another heating cycle can begin.

What is claimed is:

1. An electronic water heater thermostat system for controlling the heating of water in a water heater having electrically operable fuel control means, said system comprising, in combination, temperature sensing means effective to detect the temperature of water in the water heater and generate a corresponding electrical signal indicative of the water temperature, temperature set point means having an output producing a voltage proportional to the desired set point temperature, differential amplifier means electrically connected to said temperature sensing means and to said temperature set point means and having an output providing a voltage representing the difference between the voltage of the temperature sensing signal and the output voltage of said set point means, differential voltage means, voltage dependent hysteresis means including comparator means having inputs connected to the output of said differential amplifier means and to said differential voltage means, said comparator means also having an output, an electrically operable switch means controlling the energization of said fuel control means, said switch means being electrically connected to the output of said comparator means.

2. The combination as set forth in claim 1 including precision voltage reference means electrically connected to said temperature sensing means and to said temperature set point means.

3. The combination as set forth in claim 1, said temperature sensing means including a thermistor.

4. The combination as set forth in claim 1, said differential voltage means providing a constant differential voltage.

5. The combination as set forth in claim 1, said differential voltage means providing a variable differential voltage.

6. The combination as set forth in claim 1 including means for opening said switch means in the event said temperature sensing means is electrically opened.

7. The combination as set forth in claim 1 including voltage range converter means disposed between said temperature sensing means and said differential amplifier means.

8. The combination as set forth in claim 1, said switch means including relay means.

9. The combination as set forth in claim 1 including driver transistor means disposed between the output of said comparator means and said switch means.

10. The combination as set forth in claim 1 including positive feedback means connected to the output of said comparator means and to one of said inputs of said comparator means.

11. The combination as set forth in claim 1, said differential voltage means including a first operational amplifier, and potentiometer means controlling the gain of said first operational amplifier.

12. The combination as set forth in claim 11, said differential amplifier means including a second operational amplifier having inputs connected to said temperature sensing means and to said temperature set point means and an output connected to one of the inputs of said comparator means.

13. The combination as set forth in claim 1 including power supply means.

14. The combination as set forth in claim 1 including means for filtering the electrical signal of said temperature sensing means.

15. The combination as set forth in claim 1 including variable resistance means for varying the electrical signal of said temperature sensing means.

16. An electronic water heater thermostat system for controlling the heating of water in a water heater having electrically operable fuel control means, said system comprising, in combination, a temperature sensing circuit effective to detect the temperature of water in the water heater and generate a corresponding electrical signal indicative of the water temperature, a temperature set point circuit having an output producing a voltage proportional to the desired set point temperature, a differential amplifier circuit electrically connected to said temperature sensing circuit and to said temperature set point circuit and having an output producing a voltage representing the difference between the temperature sensing circuit signal voltage and the output voltage of said temperature set point circuit, a differential voltage circuit, a voltage dependent hysteresis circuit having a comparator having inputs connected to the output of said differential amplifier circuit and to said differential voltage circuit, said comparator also having an output, relay means including contacts controlling the energization of said fuel control means, said relay means being electrically connected to the output of said comparator, a precision voltage reference circuit electrically connected to said temperature sensing circuit and to said temperature set point circuit, and power supply means connectable to a source of AC voltage.

17. The combination as set forth in claim 16, said temperature sensing circuit including a thermistor, means for filtering the electrical signal generated by said thermistor, and variable resistance means for varying the electrical signal generated by said thermistor.

18. The combination as set forth in claim 16, said differential voltage circuit providing a constant differential voltage.

19. The combination as set forth in claim 16, said differential voltage circuit providing a variable differential voltage.

20. The combination as set forth in claim 16 including means for opening said relay contacts in the event said temperature sensing circuit is electrically opened.

21. The combination as set forth in claim 16 including a voltage range converter circuit disposed between said temperature sensing circuit and said differential amplifier circuit.

22. The combination as set forth in claim 16 including a driver transistor disposed between the output of said comparator and said relay means.

23. The combination as set forth in claim 16 including positive feedback means connected to the output of said comparator and to one of said inputs of said comparator.

24. The combination as set forth in claim 16, said voltage differential circuit including a first operational amplifier, and a potentiometer controlling the gain of said first operational amplifier.

25. The combination as set forth in claim 24, said differential amplifier circuit including a second operational amplifier having inputs connected to said temperature sensing circuit and to said temperature set point circuit, and an output connected to one of the inputs of said comparator.

* * * * *